(12) United States Patent
Frey et al.

(10) Patent No.: US 7,984,800 B2
(45) Date of Patent: Jul. 26, 2011

(54) HYDRODYNAMIC CLUTCH DEVICE

(75) Inventors: Peter Frey, Gerolzhofen (DE); Roland Baumann, Dittelbrunn (DE); Michael Greulich, Schwebheim (DE); Georg Mencher, Grafenrheinfeld (DE); Bernd Reinhardt, Schonungen/Forst (DE); Peter Hammer, Schweinfurt (DE); Patrick Rediger, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 678 days.

(21) Appl. No.: 12/079,392

(22) Filed: Mar. 26, 2008

(65) Prior Publication Data
US 2008/0236975 A1    Oct. 2, 2008

(30) Foreign Application Priority Data

Mar. 26, 2007   (DE) .......................... 10 2007 014 311

(51) Int. Cl.
*F16H 45/02*    (2006.01)
(52) U.S. Cl. ..................................... 192/3.3; 192/113.5
(58) Field of Classification Search ........................ None
See application file for complete search history.

(56) References Cited

U.S. PATENT DOCUMENTS

| | | | | |
|---|---|---|---|---|
| 3,163,271 A | * | 12/1964 | Hilpert | 192/3.29 |
| 4,523,916 A | | 6/1985 | Kizler et al. | |
| 4,951,788 A | * | 8/1990 | Martin | 192/3.3 |
| 5,209,330 A | * | 5/1993 | Macdonald | 192/3.29 |
| 5,477,950 A | * | 12/1995 | Maloof | 192/3.29 |
| 5,575,363 A | | 11/1996 | Dehrmann et al. | |
| 5,669,475 A | * | 9/1997 | Matsuoka | 192/3.29 |
| 5,964,329 A | | 10/1999 | Kawaguchi et al. | |
| 6,938,743 B2 | * | 9/2005 | Arhab et al. | 192/3.29 |
| 2001/0013454 A1 | * | 8/2001 | Yamamoto | 192/3.29 |
| 2007/0181396 A1 | * | 8/2007 | Maienschein et al. | 192/3.29 |
| 2007/0205067 A1 | * | 9/2007 | Frey et al. | 192/3.3 |

* cited by examiner

*Primary Examiner* — Rodney H Bonck
(74) *Attorney, Agent, or Firm* — Cohen Pontani Lieberman & Pavane LLP

(57) ABSTRACT

A hydrodynamic clutch includes a hydrodynamic circuit formed by at least a pump wheel and a turbine wheel in a clutch housing with a drive-side housing wall extending to the axis of rotation, and a bridging clutch with a piston capable of shifting axially relative to the drive-side housing wall. The turbine wheel is connected to a hub, which is connected for rotation in common to a takeoff, and is axially supported between the hydrodynamic circuit and a flow guide element, which is supported between the hub and the drive-side housing wall, and has first and second flow passages which are axially offset from each other. The flow guide element has a drive-side end with an axial bearing area which can be moved into axial contact with an axial bearing, which is either an axial contact surface on the drive-side housing wall or is assigned to the drive-side housing wall.

13 Claims, 7 Drawing Sheets

HYDRODYNAMIC CLUTCH DEVICE

BACKGROUND OF THE INVENTION

1. Field of the Invention

The invention pertains to a hydrodynamic clutch device of the type including a clutch housing which is rotatable about an axis of rotation and has a drive-side housing wall, a hydrodynamic circuit including a pump wheel and a turbine wheel in the clutch housing, and a bridging clutch having a piston capable of shifting axially relative to the drive-side housing wall, the piston separating a pressure space adjacent to the drive-side housing wall from a supply space.

2. Description of the Related Art

A hydrodynamic clutch device designed as a hydrodynamic torque converter is known from U.S. Pat. No. 5,964,329. A pump wheel cooperates with a turbine wheel and a stator to form a hydrodynamic circuit in a clutch housing; this circuit cooperates with a bridging clutch. The bridging clutch has a piston, which can be connected to a drive-side housing wall of the clutch housing and shifted in the axial direction. This piston is supported by way of a seal on a housing hub, which is mounted on the drive-side housing wall. This housing hub, which acts as a component of the clutch housing, serves as an axial stop for another hub, which holds the turbine wheel and possibly also a component of a torsional vibration damper. For this purpose, the side of this hub facing the housing hub is provided with a stop element, while the opposite axial side is supported by an axial bearing against the stator, which is provided as a component of the hydrodynamic circuit.

First flow channels are provided in the housing hub, and second flow channels are provided in the stop element assigned to the hub. The flow channels of the housing hub are in flow connection with first flow passages in the hub, whereas the flow channels in the stop element are in flow connection with second flow passages in the hub, where the first flow passages are axially offset from the second flow passages. By way of the first flow passages, at least one first takeoff-side flow route is connected to a pressure space, which is bounded at least essentially by the drive-side housing wall of the clutch housing and the piston, and by way of the second flow passages at least one second takeoff-side flow route is connected to a supply space, which is adjacent to the side of the piston facing away from the pressure space.

The disadvantage of the known hydrodynamic clutch device is the considerable expense which is associated with the housing hub mounted on the drive-side housing wall, because this housing hub not only must be dimensioned in the axial direction in such a way that it positions the hub, which holds the turbine wheel and/or a component of the torsional vibration damper axially with respect to the stator, but also must be dimensioned radially in such a way that it centers the hub and also the piston of the bridging clutch. It must also be ensured, furthermore, that the flow channels of the housing hub are at least essentially aligned with the flow passages of the hub. The hub which holds the turbine wheel and/or a component of the torsional vibration damper is also difficult and expensive to manufacture, because it has a complicated geometry and also because it must contain the first and the second flow passages.

SUMMARY OF THE INVENTION

The invention is based on the task of positioning, first, a hub, which holds a turbine wheel and/or a component of a torsional vibration damper, and, second, a piston of a bridging clutch with the least possible effort in a clutch housing of a hydrodynamic clutch device, this being done in such a way that, in spite of its simple design, the hub is held in position at least in the axial direction and the piston is held in position at least in the radial direction.

Before the design of the hub and of the flow guide element assigned to it is discussed in detail, the functions of these components in the hydrodynamic clutch device must be explained more precisely. The hub can serve to hold the turbine wheel and/or a component of a torsional vibration damper directly; or it can serve to hold the turbine wheel indirectly, such as by way of a component of the torsional vibration damper; or it can serve to hold a component of the torsional vibration damper indirectly, such as by way of the turbine wheel. This hub is therefore referred to in the following in brief as the "carrier hub". The function of the flow guide element is fulfilled, first, by the flow passages provided in it and, second, by its axial positioning between the carrier hub and a drive-side housing wall of a clutch housing of the hydrodynamic clutch device.

Either the drive-side housing wall of a clutch housing of the hydrodynamic clutch device acts as an axial bearing for the flow guide element and thus also for the carrier hub, or an axial bearing for the flow guide element is assigned to the drive-side housing wall. In the former case, the axial bearing area of the flow guide element facing the drive-side housing wall arrives in axial contact with an axial contact surface of the drive-side housing wall; in the other case, it arrives in contact with the axial bearing assigned to the drive-side housing wall. The essential point is that, in both possible variants, it is possible to eliminate the housing hub which would have to be mounted on the drive-side housing wall. It is significant that, to provide axial support for the flow guide element, the drive-side housing wall is extended radially inward essentially as far as the axis of rotation of the clutch housing, so that in this way the flow guide element can be offered the required axial support in the direction toward the drive. The flow guide element then in turn provides the carrier hub with axial support.

The drive-side housing wall preferably has an axial recess in the drive-side housing wall to form the axial contact surface. If this axial recess is larger in the radial direction than the diameter of the flow guide element, the flow guide element will be cleanly supported by the side of its axial bearing area which faces the drive-side housing wall, but it will also have room in the radial direction to extend across the axial recess in cases where the manufacturing tolerances of the flow guide element are superimposed unfavorably on those of the takeoff such as a gearbox input shaft. By means of an essentially arc-like section at the transition from the axial contact surface within the axial recess to the adjacent radial area of the drive-side housing wall, it is still possible to ensure, even under extreme tolerance conditions, that this axial bearing area of the flow guide element can be given suitable axial support.

When an axial contact element is assigned to the drive-side housing wall, especially to the axial recess in that wall, it is ensured—insofar as this axial contact element has a sufficient degree of hardness that no wear will occur on the axial contact surface of the drive-side housing wall, and that therefore the flow guide element will not be subjected to any undesirable play in the axial direction. It is especially preferable for the axial contact element to be made of spring steel. A solution of this type is especially favorable in cases where the flow guide element is also made of metal. The flow guide element is preferably made of a relatively hard metal such as a sintered material, and, since a sintering process can be used, the element can be produced easily. The carrier hub, which is held a certain axial distance away from the drive-side housing wall and from its axial contact surface by the flow guide element, can also be made of a sintered material. If the carrier hub interacts with the flow guide element by way of a rotation lock, there will be no relative movement between these two components and thus also no risk of wear-promoting friction. There will be relative rotational movement only between the flow guide element and the axial bearing of the drive-side housing wall. The rotation lock can also exist, of course, between the axial bearing of the drive-side housing wall and the flow guide element, so that the relative rotational movement will in this case be between the flow guide element and the carrier hub. Because both components, i.e., the carrier hub and the flow guide element, are preferably made of sintered material, no significant wear problems are to be expected in this case either.

It will generally be true of the carrier hub that, because of the flow guide element assigned to it, it can have a relatively simple design and be compact in the axial direction.

A piston of a bridging clutch is preferably centered on the flow guide element and is capable of shifting position axially with respect to the flow guide element. Thus a housing hub is not needed for the piston either. By the insertion of an intermediate seal between the piston and the flow guide element, it is ensured that the hydraulic medium which has flowed via the two flow passages provided in the flow guide element will not be able to pass from one of the two spaces, i.e., the pressure space or the supply space, into the other space, which would thus make it unavailable for its actual purpose. For the same reason, the takeoff, preferably a gearbox input shaft, also interacts with the flow guide element by way of a seal. When designed as an elastomeric ring installed between the flow guide element and the takeoff, this seal will fulfill its function by making contact with the two components. If it is in the form of a sealing gap between the flow guide element and the takeoff, it will act without contact.

By designing the first flow passages in the axial bearing area of the flow guide element in the form of groovings, it is possible for the adjacent space, such as a pressure space serving to actuate the piston of the bridging clutch, to be supplied with flow medium; in addition, however, a fluid film, which ensures very low friction at this point, develops axially between the axial bearing on the drive-side housing wall and the axial bearing area of the flow guide element. By designing the first flow passages in this way, therefore, a functional connection is established between the infeed or outflow of flow medium and the lubrication of the flow guide element against the drive-side housing wall. Because of these groovings, furthermore, there is no longer any need for the openings in the form of bores, for example, which would otherwise be necessary in the flow guide element.

In contrast, there is also the possibility of creating a functional separation between the infeed or outflow of flow medium and the lubrication of the flow guide element against the drive-side housing wall. For example, the first flow passages can be arranged a certain axial distance away from the axial bearing area of the flow guide element, whereas lubricating recesses, the purpose of which is not to allow the passage of flow medium, are provided directly in this axial bearing area. In another possible embodiment, first flow passages, which are not in the flow guide element but rather in the drive-side housing cover, preferably on the side facing the flow guide element, are assigned to the lubricating recesses in the axial bearing area of the flow guide element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
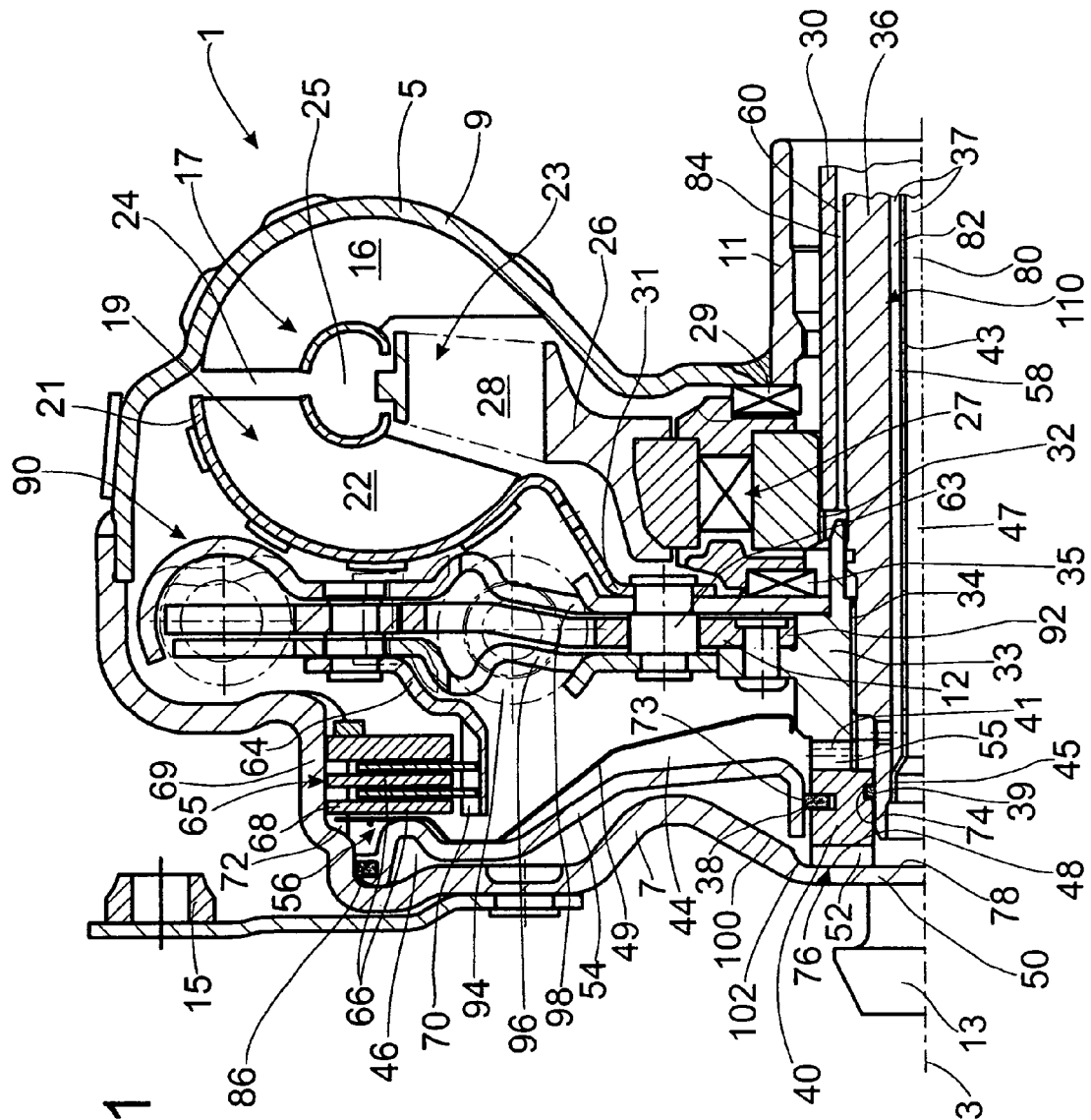
FIG. 1 shows the upper half of a longitudinal cross section through a clutch housing of a hydrodynamic clutch device with a hub, which serves to hold a torsional vibration damper and a turbine wheel by way of a component of the torsional vibration damper, and the upper half of a flow guide element, which is in working connection with the piston of a bridging clutch.

FIG. 1 shows a hydrodynamic clutch device 1, designed as a hydrodynamic torque converter. The hydrodynamic clutch device 1 has a clutch housing 5, which is able to rotate around an axis of rotation 3. On the side facing a drive (not shown), such as the crankshaft of an internal combustion engine, the clutch housing 5 has a drive-side housing wall 7, which is permanently connected to a pump wheel shell 9. This merges in the radially inner area with a pump wheel hub 11.

To return to the drive-side housing wall 7: On the side facing the drive (not shown), this wall has a bearing journal 13, which, in a manner which is already known and therefore not illustrated in detail, is supported on an element of the drive, such as the crankshaft, for the drive-side mounting of the clutch housing 5. In addition, the drive-side housing wall 7 has fastening mounts 15, which serve in the conventional manner to allow the clutch housing 5 to be fastened to the drive, preferably by way of a flexplate (not shown). With respect to drawings which show the mounting of the bearing journal of a hydrodynamic clutch element in a crankshaft of a drive and the connection of the hydrodynamic clutch device by way of a flexplate to the crankshaft, reference can be made by way of example to FIG. 1 of U.S. Pat. No. 4,523,916, which is incorporated herein by reference.

The previously mentioned pump wheel shell 9 cooperates with pump wheel vanes 16 to form a pump wheel 17, which works together with, first, a turbine wheel 19 consisting of a turbine wheel shell 21 and turbine wheel vanes 22, and, second, with a stator 23. The pump wheel 17, the turbine wheel 19, and the stator 23 form a hydrodynamic circuit 24 in the known manner, which encloses an internal torus 25.

It should also be mentioned that the stator vanes 28 of the stator 23 are mounted on a stator hub 26, which is itself mounted on a free-wheel 27. The latter is supported axially by an axial bearing 29 against the pump wheel hub 11 and is connected nonrotatably but with freedom of relative axial movement by way of a set of cooperating teeth 32 to a support shaft 30, which is located radially inside the pump wheel hub 11. The support shaft 30, which is itself designed as a hollow shaft, radially encloses a gearbox input shaft 36, serving as the takeoff 110 of the hydrodynamic clutch device 1, this input shaft being provided with a central bore 37. This central bore 37 holds a sleeve 43 in such a way that the sleeve 43 is centered radially in the central bore 37 by support areas 45. With an axial offset from these support areas 45, the sleeve forms a first supply channel 58 for fluid medium radially between itself and the enclosing wall of the center bore 37. Radially inside the sleeve 43 there remains a channel, i.e., the central supply channel 47.

The gearbox input shaft 36 has a set of cooperating teeth 34 by which it holds a hub 33 so that it cannot rotate but is free to move in the axial direction. A component 12 of a torsional vibration damper 90 is attached to the radially outer area of this hub 33, this component 12 being formed by a takeoff-side hub disk 92 of the torsional vibration damper 90. This hub disk 92 has a set of circumferential springs 94 by which it cooperates with two cover plates 96, 98, which represent additional components of the torsional vibration damper 90, where the cover plate 98 serves to accept a turbine wheel base 31 by means of a riveted connection 63, whereas the other cover plate 96 is designed so that an inner plate carrier 64 of a clutch device 65, which is designed as a multi-plate clutch, can be attached to it. The clutch device 65 has both inner clutch elements 66, which are connected nonrotatably to the inner plate carrier 64 by a set of cooperating teeth 70 on the carrier, and outer clutch elements 68, which can be brought into working connection with the inner clutch elements 66, where the outer clutch elements 68 are connected for rotation in common to the drive-side wall 7 and thus to the clutch housing 5 by means of a set of cooperating teeth 72, acting as an outer plate carrier 69. The clutch device 65 can be engaged and disengaged by means of an axially movable piston 54 and cooperates with the piston 54 to form a bridging clutch 56 of the hydrodynamic clutch device 1. As FIG. 1 shows, a separating plate 49 can be provided between the piston 54 and the torsional vibration damper 90 to isolate the hydrodynamic circuit 24 from a supply space 44, bounded axially by the piston 54 and the separating plate 49. On the side of the piston 54 facing away from this supply space 44, a pressure space 46 is provided, bounded axially by the piston and by the drive-side housing wall 7. The piston 54 is centered in the clutch housing 5 by a seal 86, which holds the piston in place and seals it off against the housing.

The hub 33 is called in the following the "carrier hub" 33, because it holds not only the torsional vibration damper 90 but also, indirectly, i.e., by way of the vibration damper, the turbine wheel 19. On one side, this hub is supported against the freewheel 27 by way of the cover plate 98 and an axial bearing 35, whereas, on the other side, it positions a flow guide element 40 in the axial direction. This flow guide other side, it positions a flow guide element 40 in the axial direction. This flow guide element is preferably made of sintered material and is connected nonrotatably to the carrier hub 33 by means of rotation lock 41. The end of the flow guide element 40 which faces the drive-side wall 7, i.e., the end which forms an axial bearing area 48, can be supported axially against an axial contact surface 50 of the drive-side housing wall 7, where this axial contact surface 50 extends radially outward from the axis of rotation 3 of the clutch housing 5. The bearing journal 13 is attached to the opposite side of the drive-side housing wall of the clutch housing 5, inside the area over which this axial contact surface 50 extends.

Figure 2:
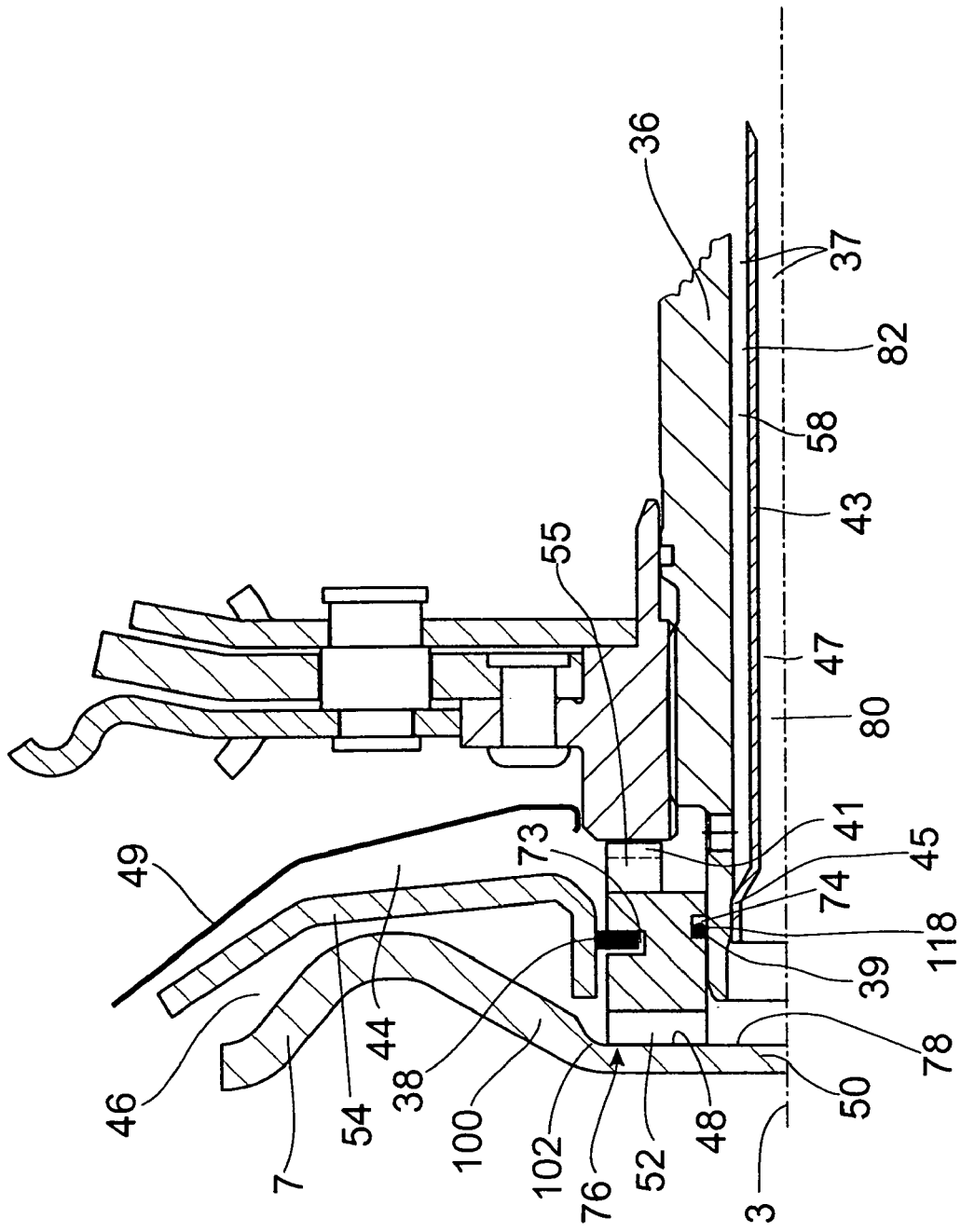
FIG. 2 shows an enlarged view of the hub and flow guide element, which are assigned to a takeoff such as a gearbox input shaft, with formation of a seal between the flow guide element and the takeoff, and with a flow guide element which has flow passages in the form of grooves facing a drive-side housing wall of the clutch housing.
Figure 3:
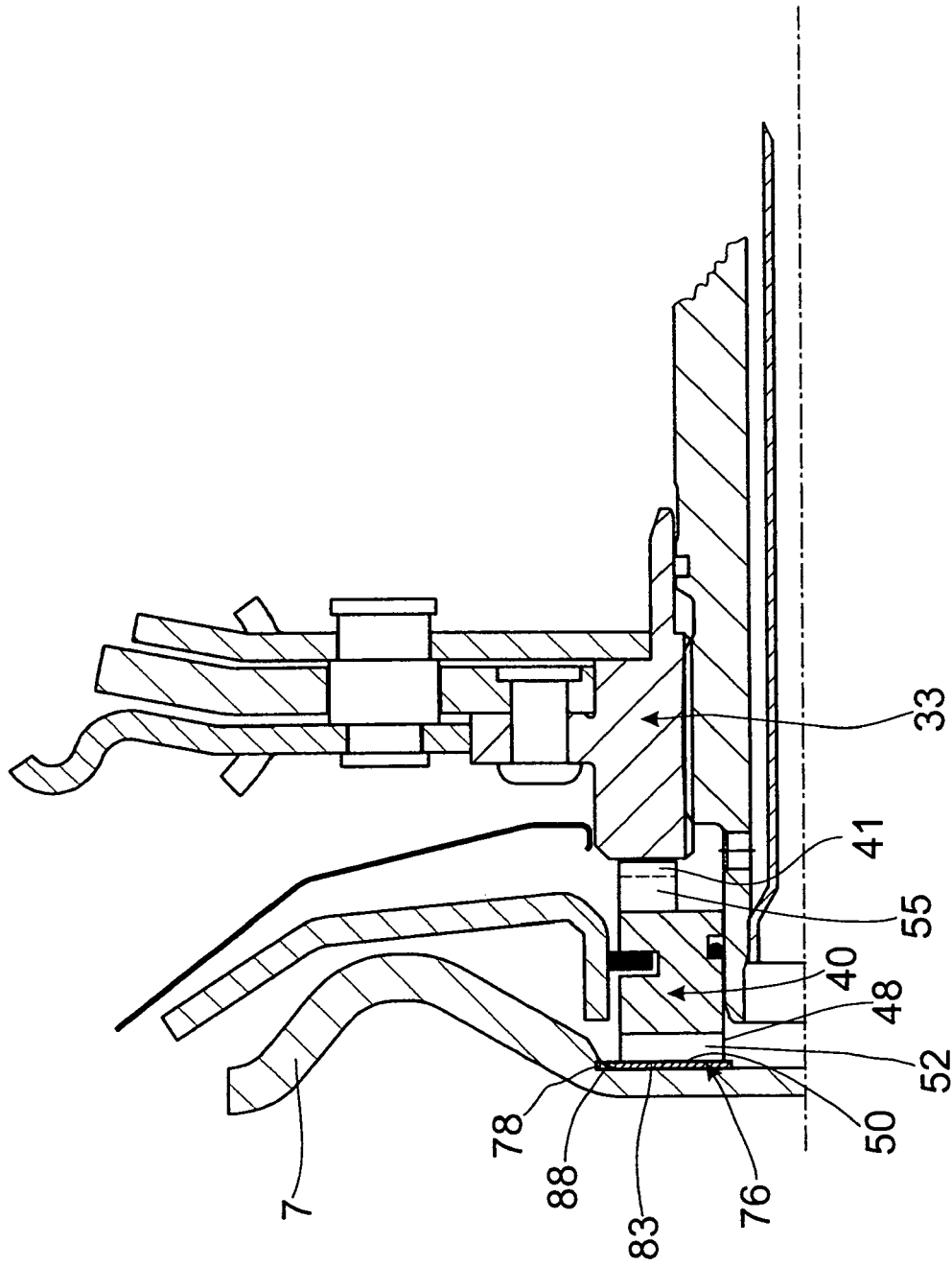
FIG. 3 is an isolated drawing showing a part of the clutch housing which serves as an axial bearing for the flow guide element.
Figure 6:
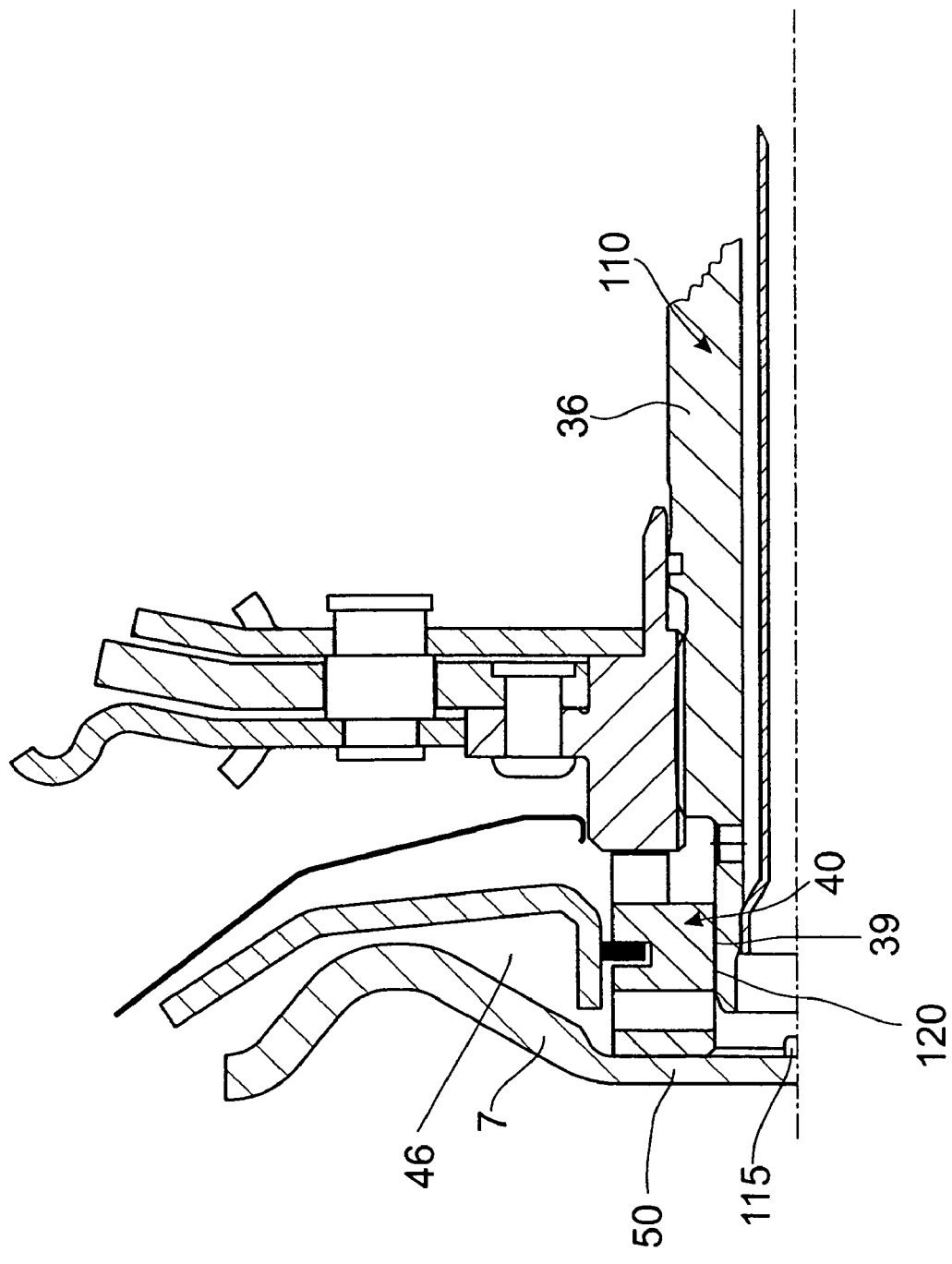
FIG. 6 is similar to FIG. 2, except that it has a different type of seal between the flow guide element and the takeoff.

Radially on the inside, the flow guide element 40 is sealed off against the gearbox input shaft 36 by a seal 39, formed as an elastomeric ring 118, which is held in a seal recess 74 (see also FIG. 2); radially on the outside, it is sealed off against the piston 54 of the bridging clutch 56 by a seal 38, held in a seal recess 73. Alternatively, the seal 39 according to FIG. 6 can also be formed as a sealing gap 120 located radially between the transmission input shaft 36 acting as the takeoff 110 and the flow guide element 40.

These two seals 38, 39 separate first flow passages 52, which pass through the flow guide element 40 in its axial bearing area 48 and are preferably designed as grooves 85 (see FIG. 2) in the axial bearing area 48, from second flow passages 55, which are formed in the axially-extending part of the rotation lock 41 versus the carrier hub 33. The first flow passages 52 are in flow connection with the central supply channel 47 of the sleeve 43, which acts as the first takeoff-side flow route 80, whereas the second flow passages 55 are in flow connection with the first supply channel 58 located radially between the sleeve 43 and the wall of the central bore 37 in the gearbox input shaft 36 surrounding the sleeve, where this supply channel 58 acts as the second takeoff-side flow route 82. In addition, a second supply channel 60 is provided radially between the gearbox input shaft 36 and the support shaft 30, which serves as a third takeoff-side flow route 84.

By way of the first flow passages 52, the first takeoff-side flow route 80 serves to establish a positive pressure in the pressure space 46 versus the supply space 44 and thus to actuate the piston 54 of the bridging clutch 56, causing it to engage, i.e., to move toward the clutch device 65, as a result of which a frictional connection is produced between the individual clutch elements 66, 68. To generate this positive pressure in the pressure space 46 versus the supply space 44, there must be connection between the first takeoff-side flow route 80 and a control device and a hydraulic fluid reservoir. Neither the control device nor the hydraulic fluid reservoir is shown in the drawing, but they can be found in FIG. 1 of U.S. Pat. No. 5,575,363, which is incorporated herein by reference.

By way of the set of cooperating teeth 34 and the second flow passages 55, the second takeoff-side flow route 82 leading to the supply space 44 serves to produce a positive pressure in this space versus the pressure space 46 and thus to actuate the piston of the bridging clutch 56, causing it to disengage, i.e., to move away from the clutch device 65, as a result of which the frictional connection between the individual clutch elements 66, 68 of the clutch device 65 is released. To generate this positive pressure in the supply space 44 versus the pressure space 46, there must be a connection between the second takeoff-side flow route 82 and the previously mentioned control device and the previously mentioned hydraulic fluid reservoir.

Fluid medium which has arrived in the supply space 44 via the second takeoff-side flow route 82 and the second flow passages 55 cools the clutch elements 66, 68 of the clutch device 75 and then enters the hydrodynamic circuit 24, from which it emerges again via the third takeoff-side flow route 84.

To return to the drive-side housing wall 7 of the clutch housing 5: In this wall, the axial contact surface 50 acting as the axial bearing 76 is provided within the radial dimension of an axial recess 78, which merges into the radially adjacent area 100 of the drive-side housing wall 7 by means of an arc-shaped section 102. The axial recess 78 is larger in the radial direction than the radial dimension of the axial bearing area 48 of the flow guide element 40, so that even unfavorable radial tolerances with respect to the positioning of the gearbox input shaft 36 and/or of the flow guide element 40 versus the axial support of the flow guide element can be easily accommodated.

The carrier hub 33 is preferably produced by means of a sintering process and therefore consists of sintered metal. In this way, it is easy to produce a carrier hub 33 with its relatively complicated geometry, but in addition a carrier hub 33 produced in this way has comparatively high strength. This also applies to the flow guide element 40 when it is made of sintered material. So that significant wear can also be avoided on the drive-side housing wall 7, which could be caused by the high strength of the flow guide element 40, it can be effective to introduce an axial contact element 83 into the axial recess 78, this contact element consisting preferably of a material of high hardness such as spring steel, so that this axial contact element 83 can be used as an axial bearing 76 for the axial bearing area 48 of the flow guide element 40. For this purpose, this axial contact element 83 has the required axial contact surface 50 on the side facing the axial bearing area 48 of the flow guide element 40. This axial contact element 83 can be mounted nonrotatably on the drive-side housing wall 7 by means of, for example, a set of cooperating teeth 88.

Figure 4:
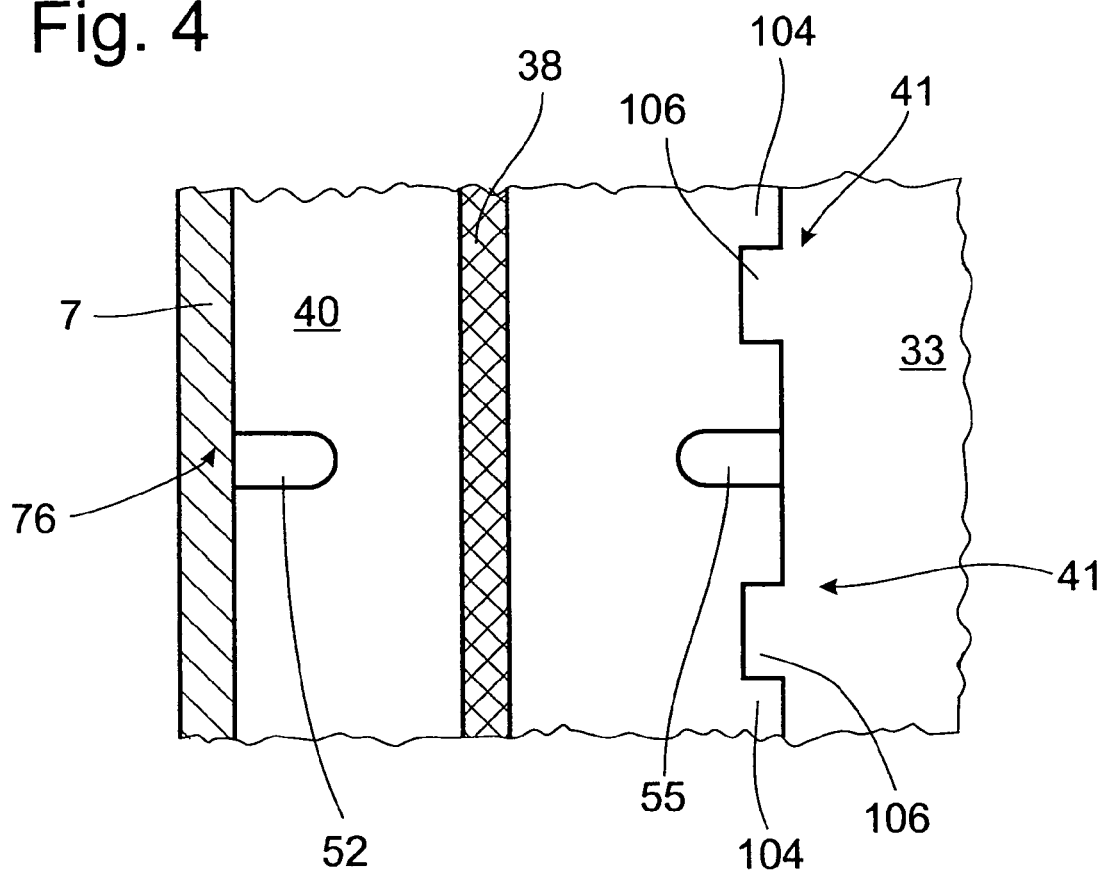
FIG. 4 shows a plan view of the hub and of the flow guide element, looking radially in from the outside, to illustrate rotation lock between the hub and the flow guide element.

Mention has already been made of the rotation lock 41 between the carrier hub 33 and the flow guide element 40. A possible design of this rotation lock 41 is illustrated in FIG. 4, which shows a plan view of the rotation lock 41, the carrier hub 33, and flow guide element 40. The rotation lock 41 is formed by a two sets of cooperating teeth 104, 106 acting between the carrier hub 33 and the flow guide element 40, comprising one set of cooperating teeth 104 on the side of the flow guide element 40 facing the carrier hub 33 and another set of cooperating teeth 106 on the side of the carrier hub 33 facing the flow guide element 40.

Figure 5:
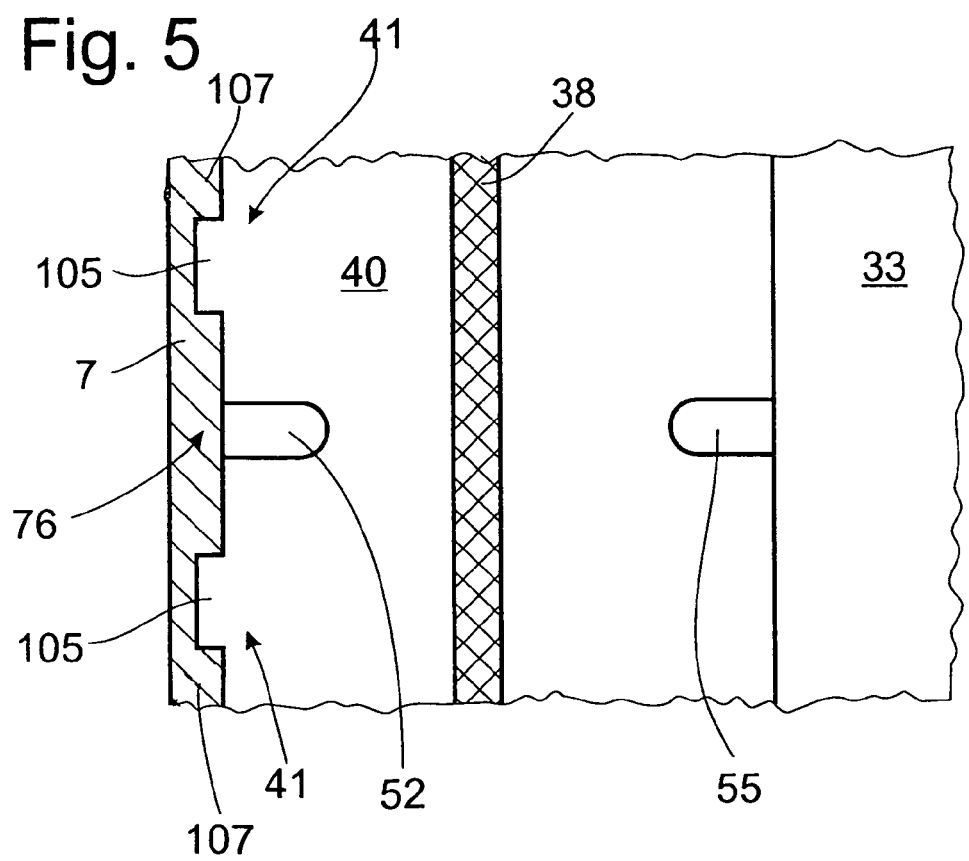
FIG. 5 is similar to FIG. 4, except that here the rotation lock is located between the flow guide element and a bearing on the clutch housing.

It would also be possible, however, for the rotation lock 41 to be located between the axial bearing 76 of the drive-side housing wall 7 and the flow guide element 40. FIG. 5 shows a possible design. The rotation lock 41 is formed here by a two sets of cooperating teeth 105, 107 acting between the axial bearing 76 and the flow guide element 40, comprising one set of cooperating teeth 105 on the side of the flow guide element 40 facing the axial bearing 76 and another set of cooperating teeth 107 on the side of the axial bearing 76 facing the flow guide element 40.

Figure 7:
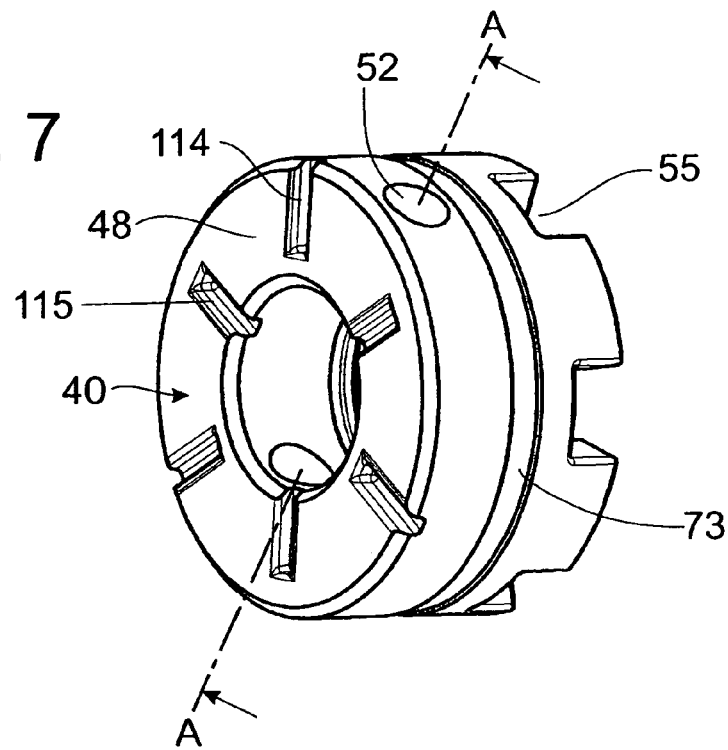
FIG. 7 is an isolated drawing of a flow guide element, which has both flow passages and lubricating recesses.
Figure 8:
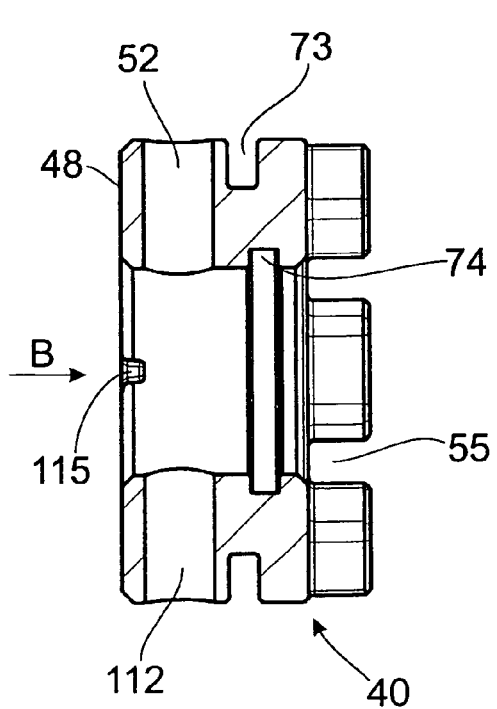
FIG. 8 shows a cross section through the flow guide element according to FIG. 7, looking in direction A-A in FIG. 7.
Figure 9:
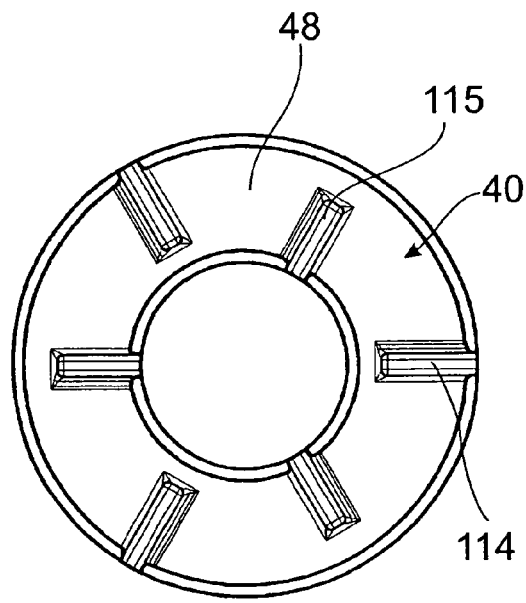
FIG. 9 shows a plan view of the flow guide element according to FIGS. 7 and 8, looking in direction B in FIG. 8.

FIGS. 7-9 show a different design of the flow guide element 40. As can be seen most clearly in FIG. 7, which is a perspective view of the flow guide element 40, not only first flow passages 52 and the axially offset second flow passages 55, but also lubricating recesses 114, 115 in the axial bearing area 48 of the flow guide element 40 are provided, the lubricating recesses having an angular offset from the flow passages 52 and 55. The lubricating recesses 114 extend radially inward from the radially outer area of the flow guide element 40, whereas the lubricating recesses 115 extend radially outward from the radially inner area of the flow guide element 40, with an angular offset from the previously mentioned lubricating recesses 114. Common to all the lubricating recesses 114, 115 is that they do not extend all the way through in the radial direction and thus do not fulfill the function of supplying the pressure space with flow medium. The purpose of the lubricating recesses 114, 115 is to allow a lubricating film to form axially between the axial bearing area 48 of the flow guide element 40 and the axial contact surface 50 (see FIG. 6) of the drive-side housing wall 7. This lubricating film ensures that the flow guide element 40 and the drive-side housing wall 7 can move relative to each other with low friction. The first flow passages 52, therefore, are alone responsible for supplying the pressure space 46 with flow medium. In this design of the flow guide element 40, these passages are designed as radial passages. The outer radial seal recess 73 can also be seen in FIGS. 7 and 8, and the inner radial seal recess 74 can be seen FIG. 8.

Figure 10:
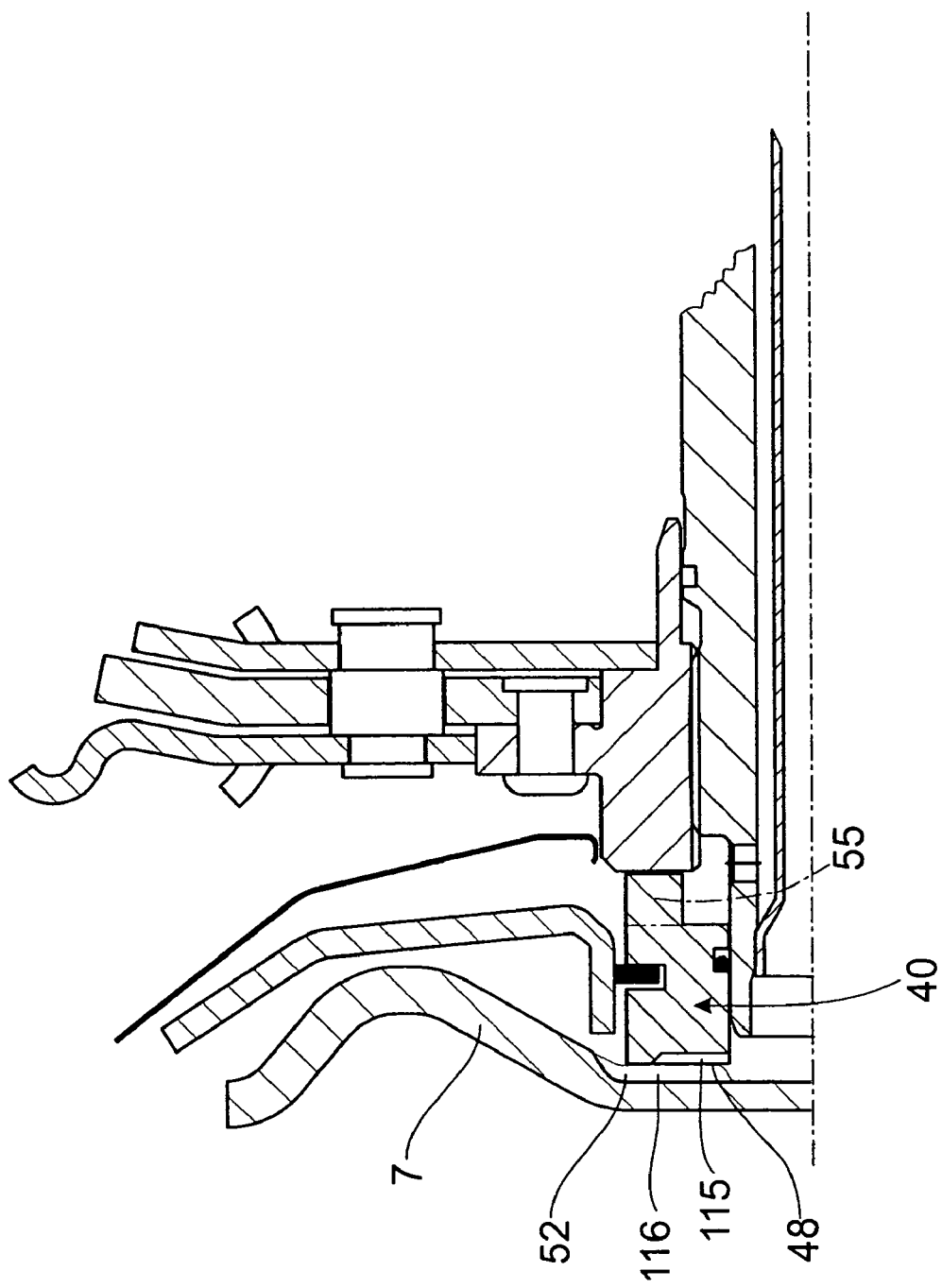
FIG. 10 is similar to FIG. 2, except that here the flow guide element has lubricating recesses in the side facing the drive-side housing wall and flow passages in the drive-side housing wall.

Lubricating recesses are also provided in the axial bearing area 48 in the design of the flow guide element 40 according to FIG. 10. In the cross section shown here, only one lubricating recess 115 can be seen. To form the first flow passages 52, however, radial passages 116 are provided in the drive-side housing cover 7, namely, on the side facing the axial bearing area 48 of the flow guide element 40. The radial passages 116 can be formed as grooves, for example, which are introduced into the drive-side housing cover 7 by deep-drawing or stamping.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic clutch device comprising:
   a clutch housing that is rotatable about an axis of rotation and has a drive-side housing wall that extends radially inward at least essentially as far as said axis;
   a hydrodynamic circuit comprising a pump wheel and a turbine wheel in said clutch housing;
   a bridging clutch having a piston capable of shifting axially relative to said drive-side housing wall, the piston separating a pressure space adjacent to the drive-side housing wall from a supply space;
   a hub that is supported axially between the hydrodynamic circuit and the drive-side housing wall, the hub being connected for rotation in common to a take-off;
   a flow guide element supported axially between the hub the drive-side housing wall, the flow guide element having at least one of first and second flow passages connecting a respective at least one of first and second take-off side flow channels to a respective at least one of the pressure space and the supply space, and a drive-side end with an axial bearing area;

a contact surface between the drive-side housing wall and the axial bearing area; and a rotation lock connecting the flow guide element to the hub for rotation in common; and the rotation lock connecting the drive-side housing wall to the flow guide element, wherein the rotation lock comprises a first set of teeth on the flow guide element facing the hub, and a second set of teeth on the hub facing the flow guide element, the first set of teeth mating with the second set of teeth.

2. The hydrodynamic clutch device of claim 1 wherein the drive-side housing wall has an axial recess, the axial contact surface being provided in the axial recess.

3. The hydrodynamic clutch device of claim 2 further comprising an axial contact element received in said recess, the axial contact element having a higher hardness than the drive-side housing wall, the axial contact surface being provided on the axial contact element.

4. The hydrodynamic clutch device of claim 1 wherein an axial recess extends radially beyond the axial bearing area of the flow guide element, the drive-side housing wall having an arc-shaped section which bounds the axial contact surface radially.

5. The hydrodynamic clutch 1 wherein the flow guide element is made of sintered material.

6. The hydrodynamic clutch device of claim 1 wherein the flow guide element supports the piston of the bridging clutch, the flow guide element being provided with a ring seal between the flow guide element and the piston.

7. The hydrodynamic clutch device of claim 1 further comprising a seal between the flow guide element and the take-off.

8. The hydrodynamic clutch device of claim 7 wherein the flow guide element has a radially inside surface provided with a recess, said seal consisting of an elastomeric ring received in said recess.

9. The hydrodynamic clutch device of claim 7 wherein said seal is formed by a sealing gap between the flow guide element and the take-off.

10. The hydrodynamic clutch device of claim 1 wherein the drive-side end of the flow guide element has radially extending grooves which form the first flow passages.

11. The hydrodynamic clutch device of claim 1 wherein said at least one first flow passage comprises radial passages which are axially spaced from said axial bearing area in said flow guide element, said axial bearing area having lubricating recesses.

12. The hydrodynamic clutch device of claim 1 wherein the axial contact surface is provided on the drive-side housing wall, the first flow passages being formed as radial recesses in the drive-side housing wall, the axial bearing area of the flow guide element having lubricating recesses.

13. A hydrodynamic clutch device comprising:

a clutch housing that is rotatable about an axis of rotation and has a drive-side housing wall that extends radially inward at least essentially as far as said axis;

a hydrodynamic circuit comprising a pump wheel and a turbine wheel in said clutch housing;

a bridging clutch having a piston capable of shifting axially relative to said drive-side housing wall, the piston separating a pressure space adjacent to the drive-side housing wall from a supply space;

a hub that is supported axially between the hydrodynamic circuit and the drive-side housing wall, the hub being connected for rotation in common to a take-off;

a flow guide element supported axially between the hub the drive-side housing wall, the flow guide element having at least one of first and second flow passages connecting a respective at least one of first and second take-off side flow channels to a respective at least one of the pressure space and the supply space, and a drive-side end with an axial bearing area having an axial contact surface with an axial bearing area;

a contact surface between the drive-side housing wall and the axial bearing area; and a rotation lock connecting the flow guide element to the hub for rotation in common; and the rotation lock connecting the drive-side housing wall to the flow guide element, wherein the rotation lock comprises a first set of teeth on the flow guide element facing the axial contact surface, and a second set of teeth on the axial contact surface facing the flow guide element, the first set of teeth mating with the second set of teeth.

* * * * *